United States Patent
Kuo et al.

(10) Patent No.: US 7,272,321 B1
(45) Date of Patent: Sep. 18, 2007

(54) PASSIVE OPTICAL NETWORK

(75) Inventors: Jer-Chen Kuo, Davis, CA (US); Gerald A. Pesavento, Davis, CA (US)

(73) Assignee: Alloptic, Inc., Pleasanton, CA (US)

( * ) Notice: Subject to any disclaimer, the term of this patent is extended or adjusted under 35 U.S.C. 154(b) by 0 days.

(21) Appl. No.: 09/568,358

(22) Filed: May 10, 2000

Related U.S. Application Data

(63) Continuation-in-part of application No. 09/363,318, filed on Jul. 28, 1999.

(60) Provisional application No. 60/133,514, filed on May 10, 1999, provisional application No. 60/133,516, filed on May 10, 1999, provisional application No. 60/133,517, filed on May 10, 1999, provisional application No. 60/133,518, filed on May 10, 1999, provisional application No. 60/133,519, filed on May 10, 1999.

(51) Int. Cl.
*H04J 14/08* (2006.01)

(52) U.S. Cl. .............. 398/99; 398/59; 398/75; 398/100; 398/168

(58) Field of Classification Search ......... 398/3, 398/4, 5, 59, 75, 168, 63, 99, 71, 72, 20, 398/98, 100
See application file for complete search history.

(56) References Cited

U.S. PATENT DOCUMENTS

| | | | |
|---|---|---|---|
| 4,727,601 A | 2/1988 | Konishi | 455/612 |
| 4,736,465 A | 4/1988 | Bobey et al. | 455/612 |
| 4,783,851 A | 11/1988 | Inou et al. | 455/612 |
| 4,837,856 A | 6/1989 | Glista, Jr. | 455/601 |
| 4,957,339 A * | 9/1990 | Fussganger et al. | 398/82 |
| 4,973,953 A | 11/1990 | Shimokawa et al. | 340/825.05 |
| 4,973,955 A | 11/1990 | Avaneas | 340/825.05 |
| 5,369,515 A | 11/1994 | Majima | 359/125 |
| 5,396,357 A | 3/1995 | Goossen et al. | 359/119 |
| 5,452,115 A * | 9/1995 | Tomioka | 398/75 |
| 5,548,431 A | 8/1996 | Shin et al. | 359/119 |
| 5,615,035 A | 3/1997 | Koai | 359/119 |
| 5,625,478 A | 4/1997 | Doerr et al. | 359/125 |
| 5,647,035 A | 7/1997 | Cadeddu et al. | 385/24 |
| 5,745,269 A | 4/1998 | Chawki et al. | 359/119 |
| 5,748,815 A | 5/1998 | Hamel et al. | 385/37 |
| 5,760,934 A | 6/1998 | Sutter et al. | 359/119 |
| 5,764,821 A | 6/1998 | Glance | 385/14 |
| 5,774,244 A | 6/1998 | Tandon et al. | 359/125 |

(Continued)

*Primary Examiner*—Christina Leung
(74) *Attorney, Agent, or Firm*—John Nielsen; Randick O'Dea, et al.

(57) ABSTRACT

A passive optical network. The optical network has an optical fiber ring with ends terminating at an optical line terminal. The optical line terminal transmits signals through the fiber ring to optical network units passively connected to the fiber ring. The optical network units receive signals from the optical line terminal through the fiber ring. In one embodiment, the optical line terminal transmits redundant signals in opposite directions through the fiber ring and the optical network units receive the redundant signals from opposite directions through the fiber ring. In another embodiment, the optical network units receive TDM signals from and transmit TDMA signals to the optical line terminal through a fiber line. A first WDM coupler passively connected to the fiber line multiplexes an overlay signal with at least one of the TDM signals and the TDMA signals for transmission through the fiber line. The overlay signal has a wavelength different than the signals with which it is multiplexed.

15 Claims, 11 Drawing Sheets

U.S. PATENT DOCUMENTS

| | | | |
|---|---|---|---|
| 5,786,913 A | 7/1998 | Pfeiffer | 359/119 |
| 5,796,501 A | 8/1998 | Sotom et al. | 359/119 |
| 5,854,698 A | 12/1998 | Eskildsen et al. | 359/119 |
| 5,870,212 A * | 2/1999 | Nathan et al. | 398/4 |
| 5,880,863 A | 3/1999 | Rideout et al. | 359/119 |
| 5,886,801 A | 3/1999 | Van Deventer | 359/119 |
| 5,898,801 A | 4/1999 | Braun et al. | 385/24 |
| 5,903,370 A | 5/1999 | Johnson | 359/119 |
| 5,903,371 A | 5/1999 | Arecco et al. | 359/119 |
| 5,903,691 A | 5/1999 | Wisseman et al. | 385/37 |
| 5,907,417 A | 5/1999 | Darcie et al. | 359/110 |
| 5,920,410 A | 7/1999 | Smith et al. | 359/119 |
| 5,923,449 A | 7/1999 | Doerr et al. | 359/125 |
| 5,933,258 A | 8/1999 | Flanagan et al. | 359/110 |
| 5,943,148 A | 8/1999 | Hamel et al. | 359/124 |
| 5,943,150 A | 8/1999 | Deri et al. | 359/133 |
| 6,137,603 A * | 10/2000 | Henmi | 398/4 |
| 6,222,653 B1* | 4/2001 | Asahi | 398/4 |
| 6,317,255 B1* | 11/2001 | Fatehi et al. | 359/341.44 |
| 6,411,410 B1* | 6/2002 | Wright et al. | 398/79 |
| 6,414,768 B1* | 7/2002 | Sakata et al. | 398/59 |

* cited by examiner

FIG. − 3
(Prior Art)

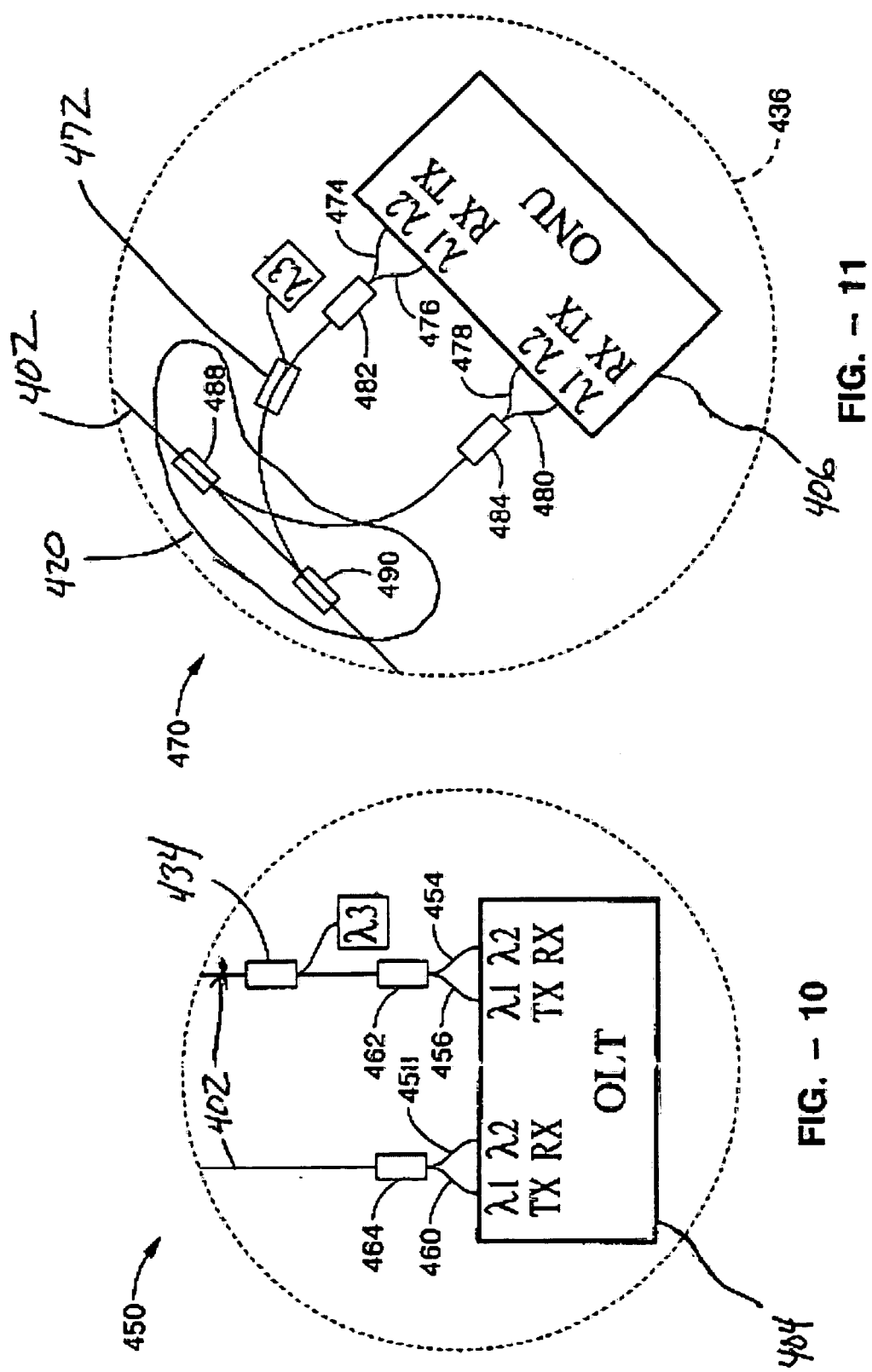

PASSIVE OPTICAL NETWORK

CROSS REFERENCE TO RELATED APPLICATIONS

This application is a continuation-in-part of U.S. application Ser. No. 09/363,318 filed Jul. 28, 1999, which claims the benefit of U.S. Provisional Application No. 60/133,517 filed May 10, 1999. This application also claims the benefit of U.S. Provisional Application Nos. 60/133,514, 60/133,516, 60/133,517, 60/133,518, and 60/133,519 all filed May 10, 1999. The entire disclosures of the aforementioned applications are incorporated herein by reference.

FIELD OF THE INVENTION

The present invention relates generally to fiber optic networks and more particularly to passive optical networks employing a ring architecture for fault protection and passive optical networks employing a wavelength division multiplexing overlay for increased bandwidth.

BACKGROUND OF THE INVENTION

A passive-optical network ("PON") is a fiber optic network to which users are connected through passive rather than active devices. PONs are commonly used to provide high speed information services such as voice, data and video in local access networks, local area networks and wide area networks. A PON system includes an optical line terminal ("OLT"), typically located in a central office of a telecommunications provider, multiple optical network units ("ONUs"), typically located near end-user subscribers, and an optical fiber transmission line to which the OLT and the ONUs are connected for delivering information services to the subscribers. These optical networks do not require an optical-to-electrical-to-optical conversion at each node, and instead rely on passive optical components which are considered more reliable. PONs are also less expensive than other types of networks and allow use of multiple optical wavelengths to increase network bandwidth.

Conventional PON systems employ point-to-multipoint tree, star, or bus architectures. However, tree and bus architectures do not protect against certain network failures such as those caused from fiber cable cuts or component failures, whereas star architectures may demand relatively greater amounts of fiber cable. In a typical tree PON 10, as shown in FIG. 1, an OLT 12 connects via an optical transmission line 14 to a 1:N passive optical splitter 16. In turn, the optical splitter 16 splits an optical signal provided by the OLT to several ONUs 20-26. With sufficient optical power supplied to its input, the 1:N splitter can be of any size N. The available optical power budget is determined by the strength of the laser diode transmitters, the insertion loss of the passive network including fiber, connectors and couplers, and the receiver sensitivity. The amount of optical fiber deployed in the outside plant can be reduced by locating the 1:N splitter centrally among the ONUs, although it is often convenient to place the 1:N splitter within the Central Office at the OLT location. Point-to-multipoint PONs, such as the tree configuration described in FIG. 1, allow a single laser within the broadcast Optical Line Terminal (OLT) to be shared among N Optical Network Units (ONUs).

If the ONUs are more widely distributed, then the conventional PON bus network 30 as shown in FIG. 2 is often used. An Optical Line Terminal 32 is connected to an optical transmission line 34. On the transmission line are a number of sequential optical tap couplers referred to simply as couplers ("C"). A fiber optic coupler (or splitter) is a passive optical component with three or more fiber ports that split the optical signal among fiber ports in a ratio that can be specified. The lightwaves are split in a similar manner to a beam splitter in bulk optics, but done within the optical fiber itself. Optical couplers are typically made from a fused fiber biconical taper method or by aligning and fixing fibers to waveguide couplers. A coupler 36 splits off a portion of the signal power coming from the OLT 32 and transmits it to ONU1 38. The remaining portion of the optical signal from the OLT 32 continues on down the bus to coupler 40 which splits more signal power off to ONU2 42. The bus may be configured to any length, provided that sufficient signal power is available. Optical signal repeaters may be used on the bus to allow for extension of the bus. Any of the ONUs can transmit back to the OLT 32, and their signals are coupled to only travel in the direction toward the OLT so as not to interfere with the other ONUs on the line.

The tree and bus PON networks are not protected against cable cuts and they require one or more fibers per ONU.

Several types of tree and bus PON networks have been proposed using a signal containing single and/or multiple discrete wavelengths by the use of wavelength division multiplexing. Shown in FIG. 3 is an example of one such network 60. Within the OLT 62, a series of optical transceivers 64-70 (transmitter and receiver) represent a series of optical channels that are multiplexed via a wavelength division multiplexer ("WDM") 72. The multiplexed signal is routed through an optical trunk transmission line 78 to a passive splitter 80. The multiplexed signal is split off as a tree network to a series of ONUs 84-90 that each contain a filter or internal WDM for extracting desired wavelengths. The ONUs may send a multiplexed signal which passes back to the demultiplexer of WDM 72. Using wavelength division multiplexing, a number of optical channels can be supported by a transmission line having a single optical fiber.

Protection against cable cuts can be found with conventional "active" optical networks employing a ring architecture, such as Synchronous Digital Hierarchy/Synchronous Optical Network (SDH/SONET) and Fiber Data Distributed Interface (FDDI) networks. These ring based networks are "active" in the sense that, at each network node, an optical-to-electrical-to-optical (O/E/O) data regeneration is performed. Each active network node within a SONET network is referred to as an "add/drop multiplexer" ("ADM"). An exemplary SONET ring 100 is shown in FIG. 4. The ADM 102 contains twin pairs of transmitters and receivers which connect on one side of the ring to the pair of optical transmission lines 104, 106 that are connected to a transmitter and receiver pair for another ADM 108. Each ADM 108, 114, 120, 126, 132, 138, 144 within the ring acts as a repeater by re-transmitting the signal it receives in the same direction as received, thereby transmitting the signal around the ring. Optical transmission line segment pairs extend between each pair of adjacent ADMs and comprise the optical ring. When the cable is cut at any one place within the ring, these active networks can route the signal on an alternate path within the ring to effect what is termed "self-healing." However, each ADM within the ring performs data reception and data regeneration, therefore a failure within an ADM can disrupt overall communication in the ring. These active ring networks are symmetrical networks operating at a single line interface rate. SDH/SONET networks are highly-survivable optical based networks most often configured with a dual ring architecture of the type shown in FIG. 4. This architecture is more flexible than a point-to-point configuration, and allows for a full redundancy and virtually instantaneous fault protection. With built in node regeneration, SDH/SONET rings are primarily used in long-distance and metropolitan areas.

Conventional passive optical networks do not provide the redundancy that is necessary in a number of environments while the SONET active-ring networks, although "self-healing," are costly due to the signal regeneration requirements and are not protected against failures within the regenerative ADMs used within the optical ring.

Accordingly, and as recognized by the inventors hereof, a need exists for a network having the fault tolerance of an active ring network, and the reliability and lower cost of a passive optical network.

SUMMARY OF THE INVENTION

The fault tolerant ring-based passive optical network in accordance with the present invention satisfies the need for a short-haul, reliable, and fault-tolerant network, while overcoming deficiencies in previous networks.

The ring architecture used in the present invention provides for a passive optical network (PON) system with fault protection that prevents line failures due to cable cuts and wherein an Optical Network Unit (ONU) failure does not cause a service interruption. The ring architecture in addition minimizes the amount of optical fiber used, allows for a flexible geographic overlay, and allows both ends of the optical fiber to start and terminate within the Central Office (or other central facility) thereby simplifying system monitoring and fault location testing.

A Passive Optical Network (PON) is called "passive" because it eliminates "active" electronics in the network. Eliminating these active devices in the network increases the reliability of the network while reducing the amount of maintenance required. Typical fiber access architectures deliver data directly to large users on a switch service basis. This approach is inefficient in terms of the amount of information handling capacity provided and the complexity. The ring based PON of this invention provides a sensible cost-effective alternative which shares the enormous capacity of single mode fiber among groups of subscribers accessing a single fiber system. The network design is appropriate for a variety of passive all-optical networks, such as for subscriber loop access, and local and wide area networking.

The present invention distributes data to/from an Optical Line Terminal (OLT) located at a central point such as a Central Office from/to multiple Optical Network Units (ONUs) that are located as part of the outside cable plant or at the end-user subscriber location. The network communicates downstream in a broadcast fashion, in that each Optical Network Unit receives the full bandwidth of the information from the OLT. A fixed or dynamic time division multiple access technology is used upstream, from the ONUs to the OLT.

The inventive network uses a common fiber cable that is connected at one end at the OLT, routes to ONUs in the field, and returns to the same OLT. Descriptions of single cables or single optic fibers, within the description include arrangements such as splices and connections wherein a single optic path is established. Several point-to-multipoint topologies are possible since a common fiber cable is employed which itself carries multiple bare fibers. The network can be organized to physically behave as a star or bus network, while being geographically deployed as a ring network with its numerous advantages.

The present invention uses one to multiple fiber port, 1:2 and 2:2 optical splitters/couplers which are passive components that tap a desired percent of light to each ONU. The 1:2 and 2:2 optical couplers are common passive optical components and can be used in certain tap ratios to maximize optical power budget within the optical ring. Each node requires one or more tap couplers to insert optical signals to and from the backbone optical fiber. WDM couplers can also be used at the ONUs for adding individual wavelength channels to and from the backbone optical fiber.

The present invention can employ back-to-back optical tap couplers at the ONU arranged such that the redundant transmitters do not loop back upon one another. The ONU redundant receivers additionally can use this arrangement, or more simply, 2:2 optical couplers with two ports to the ONU and two ports to the fiber ring.

The OLT and ONUs, when configured in the inventive ring configuration, can use redundant laser transmitters (TX) and receivers (RX) to protect the network integrity against component failures. By monitoring the redundant upstream traffic at the OLT, coming from both directions on the ring, the OLT can choose the higher powered signal, thus always homing to the highest optical power level. The OLT can use either its standard traffic receivers or optical taps to monitor the upstream signal. Alarm reporting is performed by an embedded operations control channel within the time division multiplexed data stream.

Numerous variations of this inventive principle can be configured. By way of example and not of limitation, a dual-ring redundant PON may be configured which consists of dual fiber-optic rings with built-in redundancy and monitoring. Each fiber ring carries a redundant signal bi-directionally, one in a clock-wise and one duplicate signal in a counter-clock-wise direction. One fiber is used for downstream traffic, and the other fiber is used for upstream traffic. This redundancy of signal allows for a failure in the fiber cable plant while maintaining network integrity. Two or more optical tap couplers are used at each ONU. A monitor 1:2 tap coupler may also be used to provide a monitoring feature, so the OLT can detect optical ring transmission failures. The invention allows for a fault tolerant passive optical ring network, with both fault detection and optical testing ports at the OLT.

In addition, a 4-fiber ring PON can be constructed which can operate with larger circumference rings. Each ONU employs redundant transmitters, wherein each is transmitting on a separate individual fiber within a single fiber cable. The OLT similarly transmits to individual fibers on the identical optical cable. Optical insertion loss is minimized by using only a single optical tap per fiber for each ONU, which maximizes the optical power budget of the network. Monitoring and fiber test ports can be added to the OLT.

Additionally, a short-range single fiber WDM PON can be constructed which provides a fault tolerant one fiber ring. Each ONU transmits two redundant signals 12 in opposite directions upstream around the ring to the OLT. Likewise, each ONU receives two redundant signals 11 from opposite directions downstream around the ring from the OLT. The two wavelengths 11 and 12 can be any values and are multiplexed and demultiplexed using WDM couplers. Multiple wavelengths (more than two) using Dense Wavelength Division Multiplexing (DWDM) can also be used at each OLT and ONU to increase system bandwidth. Back-to-back passive optical tap couplers are used to drop and add signals to and from the ONUs and OLT. Therefore, it can be seen that a number of variations can be arrived at for the fault tolerant ring passive optical network of the present invention.

An object of the invention is to provide an optical network wherein the signal from the OLT is routed without disruption to a series of ONUs.

Another object of the invention is to provide an optical network wherein the ONUs are connected passively to the network, such that failures within an ONU do not affect the remainder of the network.

Another object of the invention is to provide a fault-tolerant optical network wherein the network is formed into a ring and redundant copies of signals are sent in each direction on the ring.

Another object of the invention is to provide a scalable ring passive optical network wherein the number of optical rings within the network can be varied according to the traffic density, number of ONUs, and required circumference of the ring.

Another object of the invention is to provide a passive optical network wherein signals can be wavelength division multiplexed as they are coupled both onto and from the optical rings of the network.

Another object of the invention is to provide a passive optical network wherein the signals moving both onto and from the network can be multiplexed using wide bandwidth wavelength division multiplexing.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 10 shows the connection of the OLT used in FIG. 9;

FIG. 11 shows the connection of an exemplary ONU from FIG. 9;

Corresponding reference characters refer to corresponding parts and features throughout the drawings.

DETAILED DESCRIPTION OF PREFERRED EMBODIMENTS

Figures 1, 2:
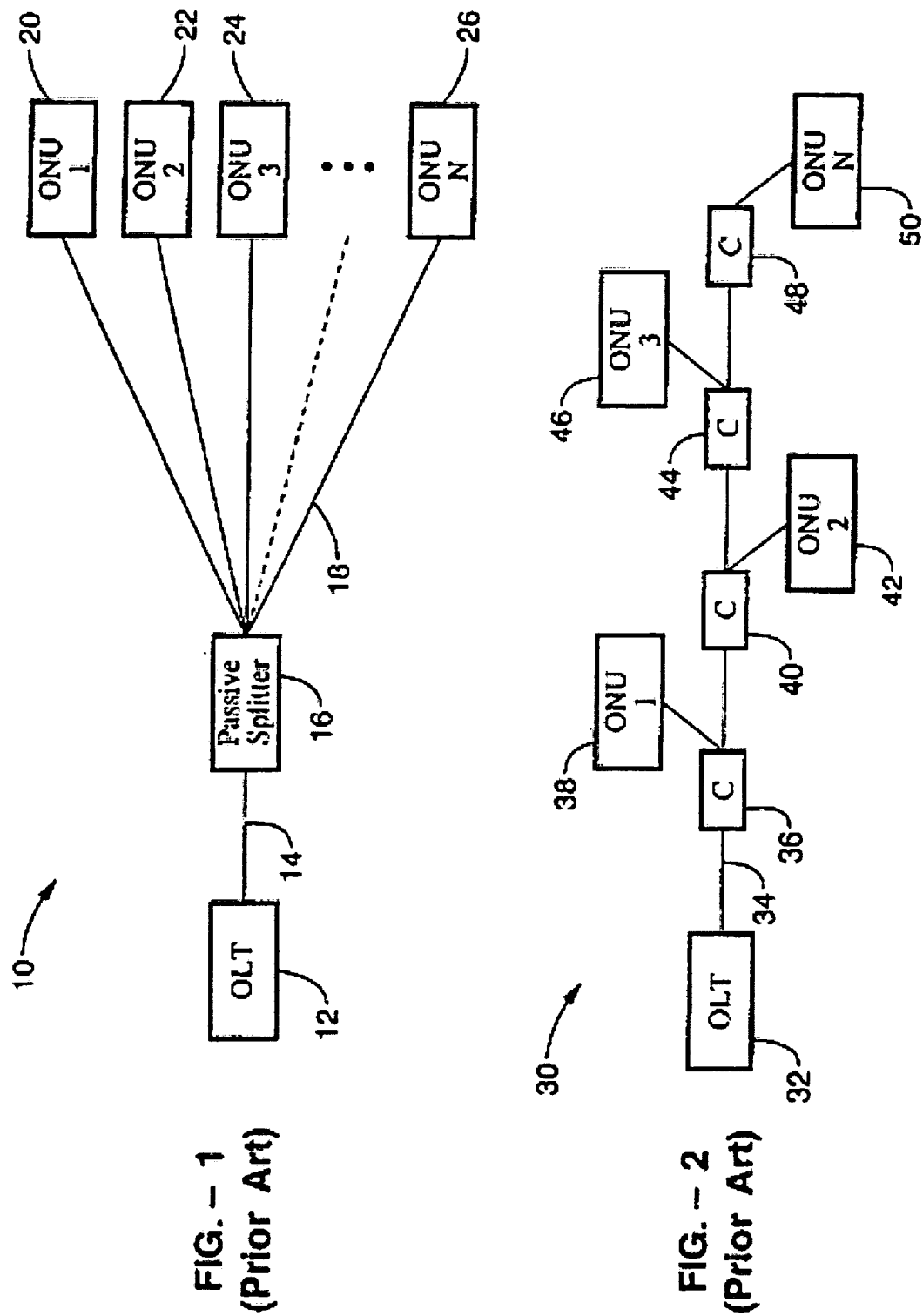
FIG. 1 is a block diagram of a conventional tree structured passive optical network (PON)
FIG. 2 is a block diagram of a conventional bus structured passive optical network (PON)
Figure 3:
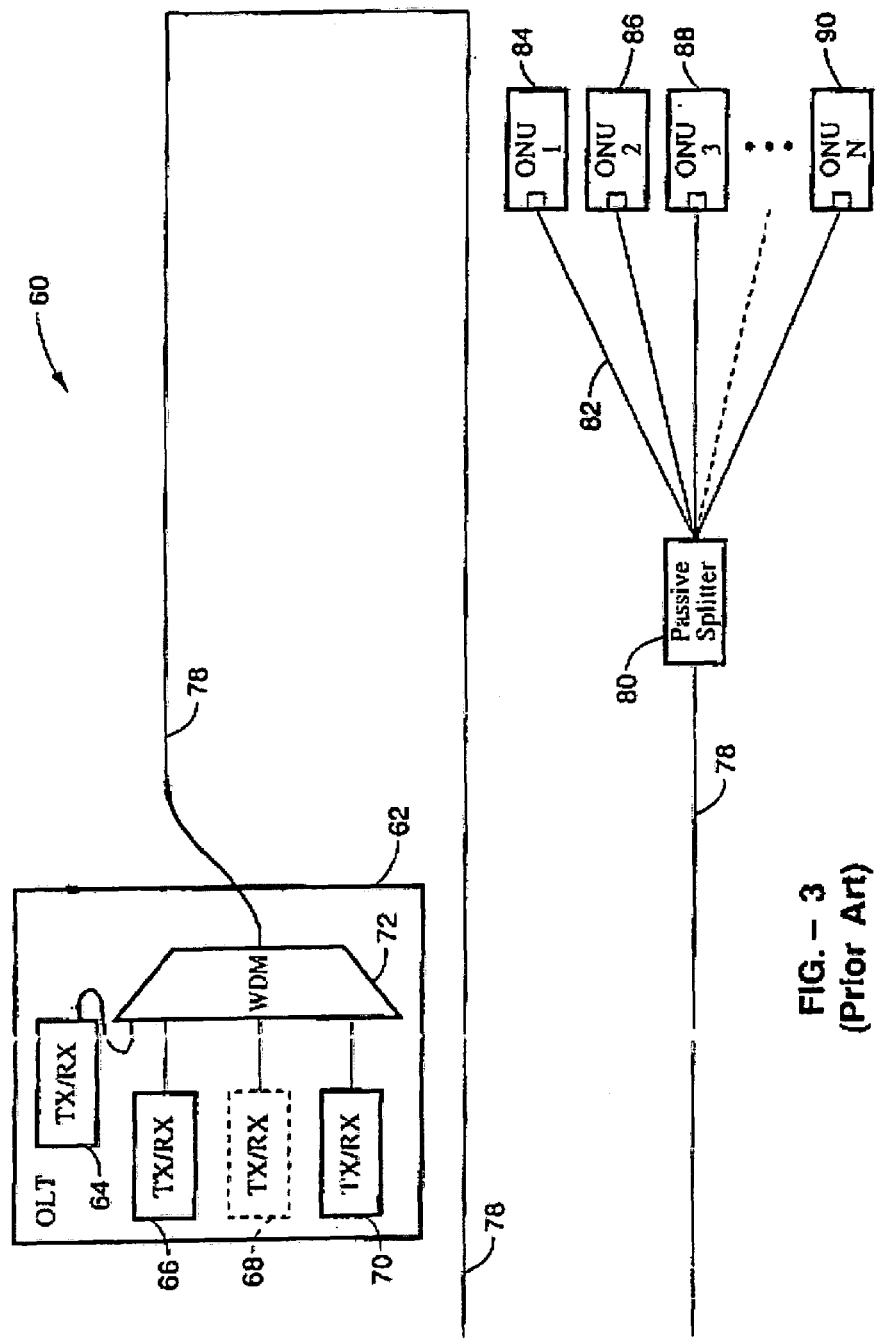
FIG. 3 is a block diagram of a conventional tree structured passive optical network wherein WDM multiplexing is used to increase the transmission bandwidth.
Figure 4:
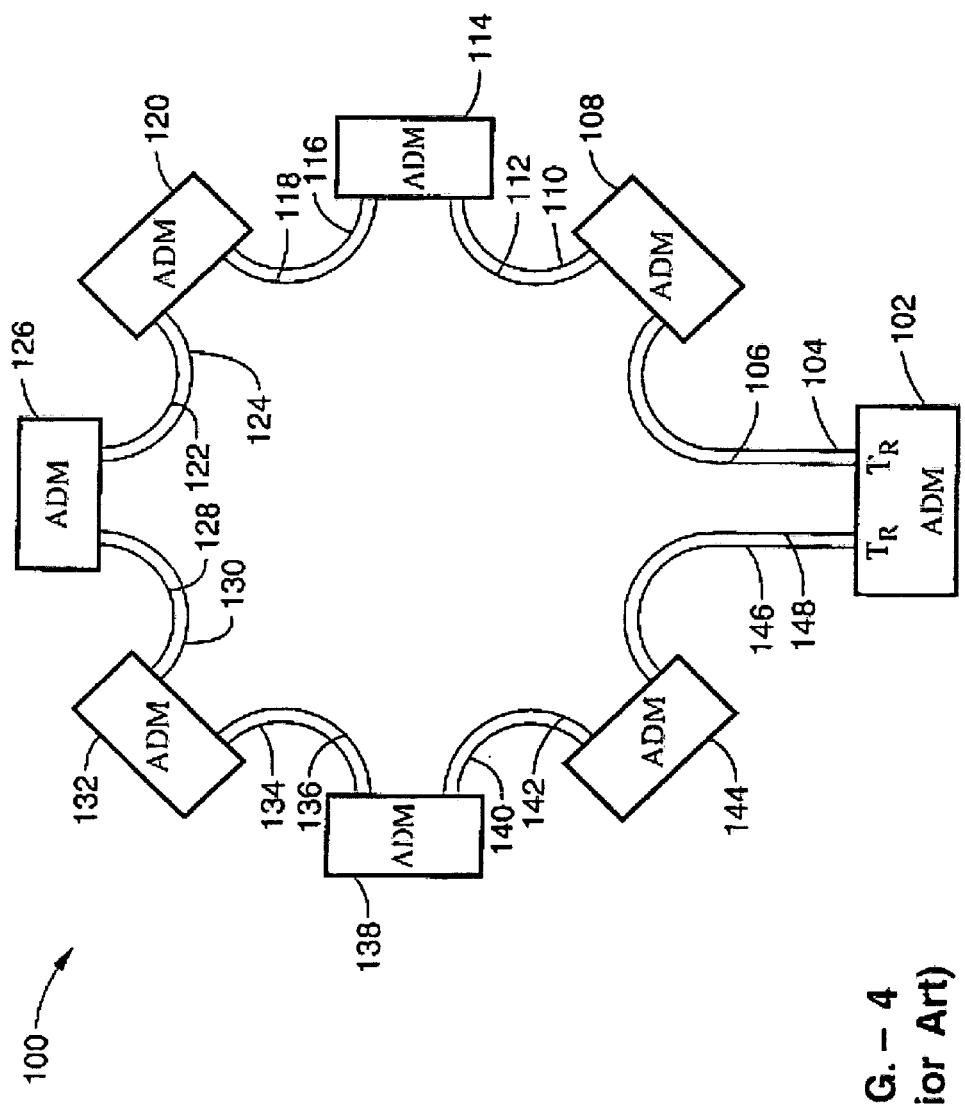
FIG. 4 is a block diagram of a conventional SONET network, which is an active network optical network formed into a ring.
Figure 5:
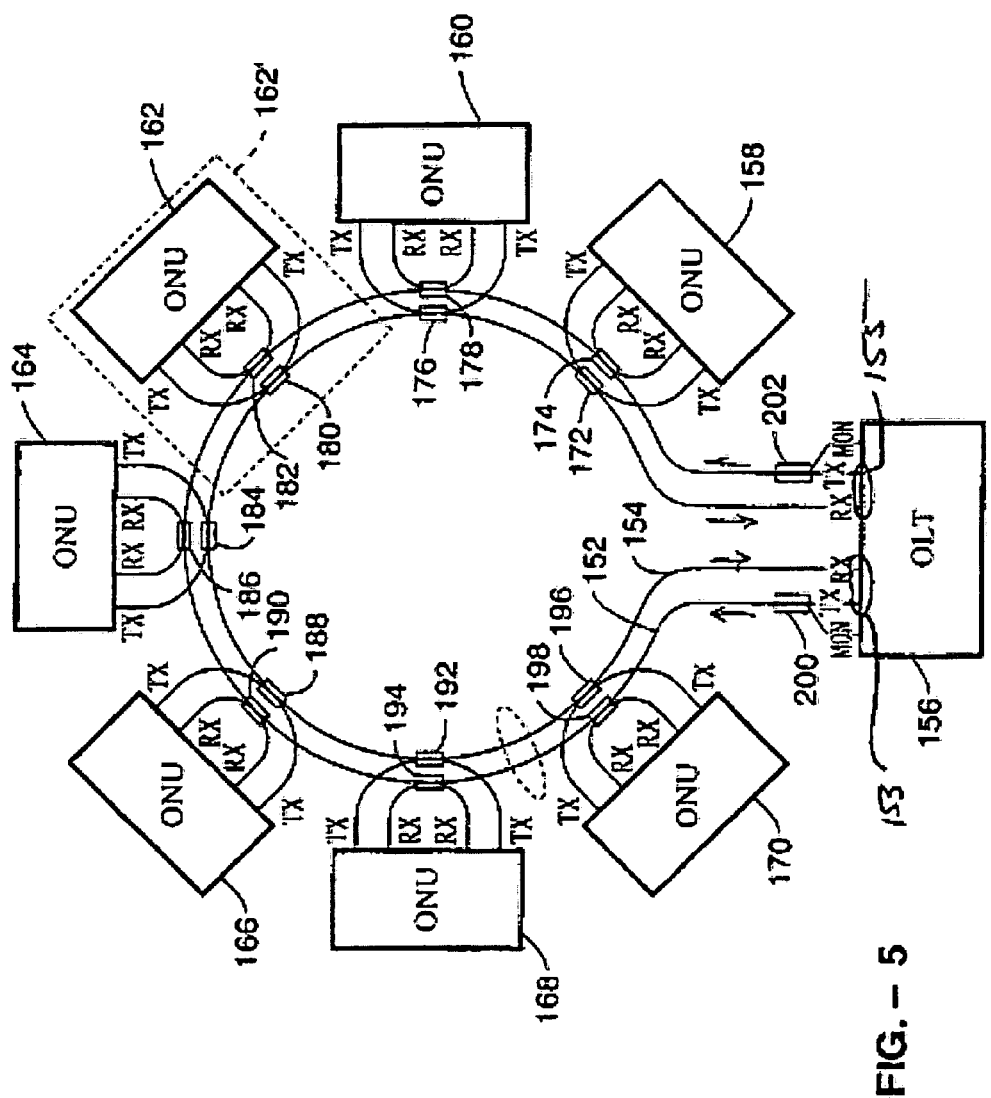
FIG. 5 is a block diagram of a two-fiber ring PON of the present invention.

A passive optical network according to one embodiment of the present invention is shown in FIG. 5 and is indicated generally by reference character 150. As shown in FIG. 5, the PON 150 employs a fiber ring 151 consisting of a downstream optical fiber 152 and an upstream optical fiber 154 so as to provide the PON 150 with built-in redundancy and monitoring, as will be explained. The PON also includes an optical line terminal ("OLT") 156 at which opposite ends 153, 155 of the fiber ring 151 terminate. The OLT 156 preferably distributes high bandwidth information to multiple optical network units ("ONUs") 158-170. Each ONU may deliver any configured combination of voice, data, and video service and may receive/transmit a portion of the total bandwidth within the network. The OLT 156 is preferably installed in a central office, hub, or point-of-presence and provides interfaces (not shown) to digital switches and routers utilizing, for example, E1/T1, E3/T3, OC-3, OC-N, Ethernet, ATM, V5.1/V5.2 and other preferably high speed protocols. These high bandwidth signals are multiplexed at an input (not shown) to the OLT 156 and then distributed redundantly through the downstream optical fiber 152. In other words, the OLT 156 transmits redundant signals in opposite directions through the downstream optical fiber 152, one in a clockwise direction and one in a counterclockwise direction. The receiver portions of the ONUs 158-170 each have a bidirectional coupler 174, 178, 182, 186, 190, 194, 198 associated therewith to direct a portion of the redundant downstream traffic to the ONUs. This redundancy of signal allows for a failure in the fiber cable plant while maintaining network integrity. Similarly, return-path signals from the ONUs 158-170 are transmitted redundantly in both clockwise and counterclockwise directions through the upstream optical fiber 154 to the OLT 156. Pairs of 1:2 tap couplers 172, 176, 180, 184, 188, 192, 196 are used at each ONU 158-170 to couple the redundant ONU upstream traffic to the upstream optical fiber 154.

Figure 7:
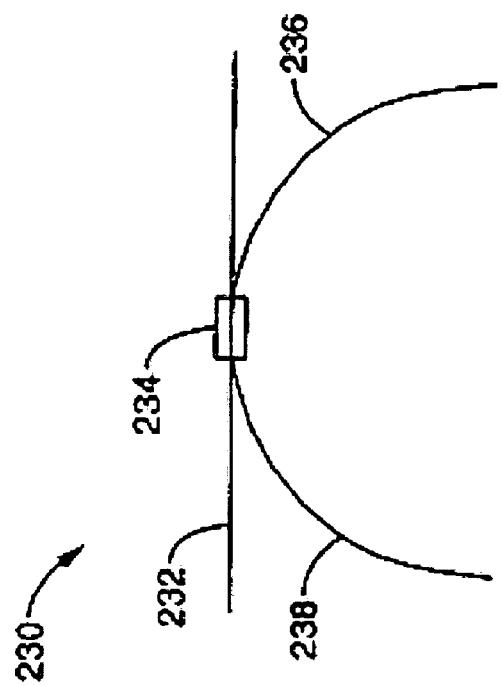
FIG. 7 is a block diagram of an optical 2:2 coupler.
Figure 6:
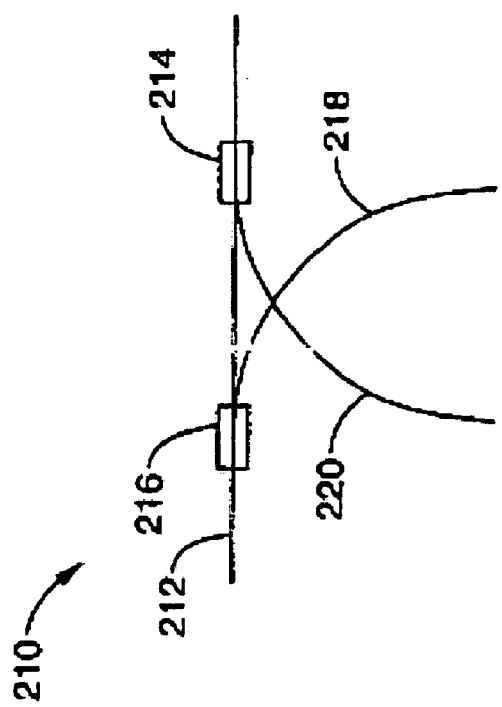
FIG. 6 is a block diagram of an optical coupler formed from two 1:2 tap couplers.

The bidirectional couplers used in this configuration can be, for example, 2:2 couplers or, more preferably, a pair of back-to-back 1:2 couplers. The tap couplers can have any suitable coupling ratio, but this ratio is typically a 10%-90% split, where 10% of the optical signal is dropped to/from a particular ONU and 90% of the remaining signal travels onward through the fiber ring 151. As shown in FIG. 6, a tap coupler 210 on an optical trunk 212 can be constructed using a pair of 1:2 couplers 214, 216 with taps 218 and 220. Alternatively, an optical trunk 230 as in FIG. 7 may employ a single 2:2 tap coupler 234. Other optical tapping components such as optical circulators can be used at each node for coupling/splitting the signals.

Referring again to FIG. 5, the OLT 156 uses a 1:2 tap coupler monitor 200 to receive a small percentage of light coming to the OLT 156 from the transmitter connected to the opposite end 155 of the fiber ring 151. The tap coupler monitor 200 provides a sensor for a monitoring feature, so the OLT 156 can detect a failure in the downstream optical fiber 152. A similar tap coupler monitor 202 is employed for signals traveling through the optical fiber 152 in the opposing direction. Thus, the ring structure of this preferred embodiment provides for full cable cut fault protection without a disruption in network service, even if both of the optical fibers 152, 154 are located within the same optical cable.

The maximum circumference of a PON ring as per the invention is dependent on the number of ONUs (drops), the amplitude of the OLT signals, and the insertion loss of the tap couplers. A typical optical power budget for a digital PON is +28 dB. Each 1:2 and 2:2 coupler has optical insertion loss of 0.04 to 3.7 dB on the tap port, depending on the optical coupling ratio. Single mode optical fiber has insertion loss of 0.1 to 0.5 dB per kilometer at 1550 and 1310 nm wavelengths. Therefore, passive optical network rings can be over 100 km in circumference where only a few ONUs are installed or, more typically, approximately 20 km in circumference with eight ONUs, depending on the tap ratios selected. However, by using a fiber ring having, for example, 24 or more optical fibers, several hundred ONUs can be deployed.

Figure 8:
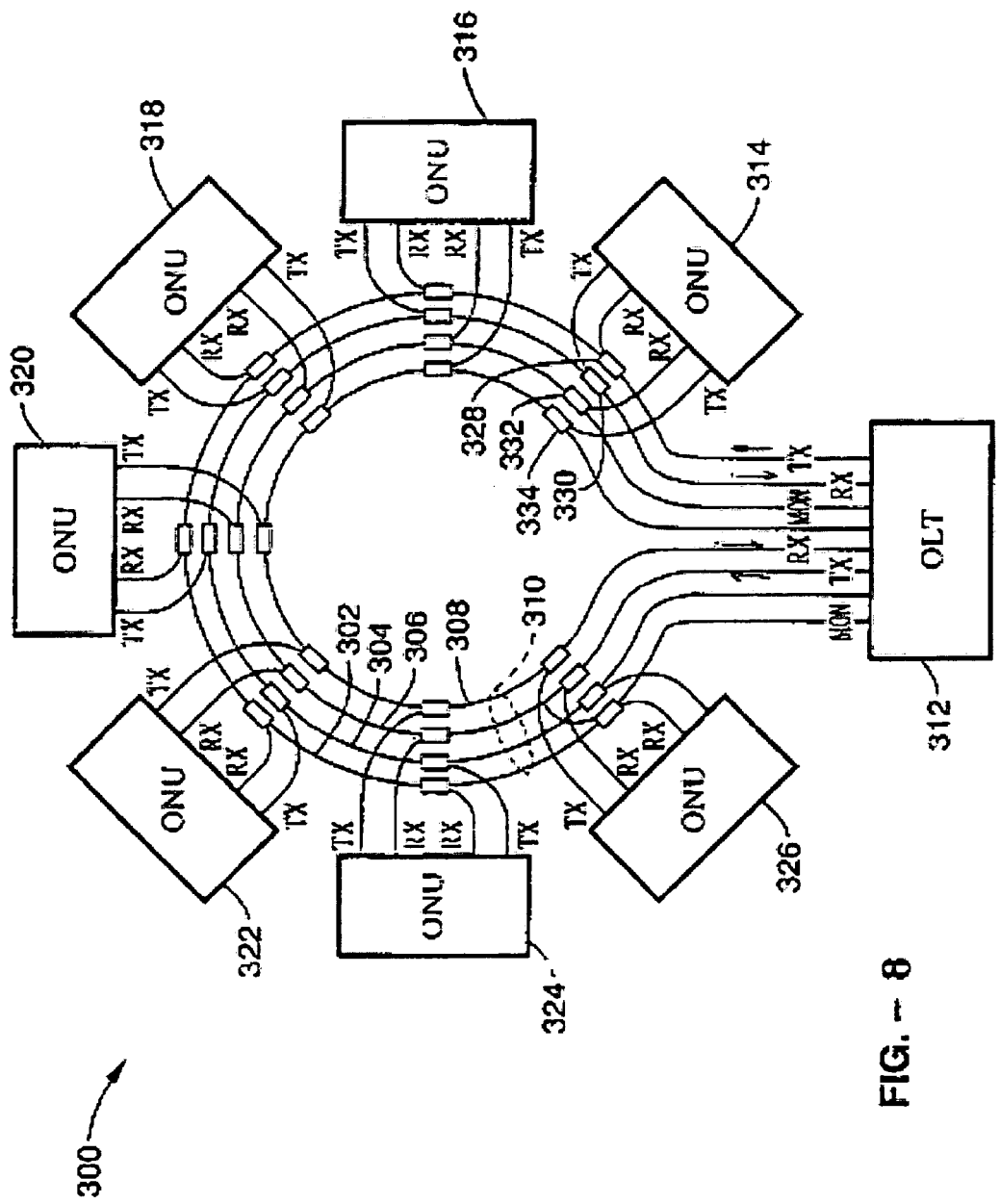
FIG. 8 is a block diagram of a four-fiber ring PON of the present invention.

Shown in FIG. 8 is a fault tolerant PON 300 having a fiber ring 310 which includes four optical fibers 302, 304, 306 308, preferably within a single optical cable. Fibers 302, 306 are used for downstream (i.e., from the OLT to the ONUs) communications, while the other two fibers 304, 308 are used for upstream (i.e., from the ONUs to the OLT) traffic. The OLT 312 and each ONU 314-326 preferably employ redundant laser diodes within their optical transmitters (TX) and optical receivers (RX). The redundant transmitted upstream signals from an ONU 314 are sent in opposite directions on different optical fibers within the same fiber cable. Redundant downstream signals from the OLT 312 are also provided to the ONU 314 as well as to the others in the ring. Four passive three-port tap couplers 328, 330, 332, 334 provide coupling to the ONU 314 to drop downstream traffic and add upstream traffic. Each ONU employs a similar set of four couplers. The system may be configured to operate with any form of passive tap coupler and percent tap value. Generally, smaller tap percentages are used in proximity to the OLT 312 while larger tap percentage couplers are used further from the OLT 312 thereby optimizing the optical power budget of the network and maximizing the distance reach (ring circumference). The OLT 312 transmits redundant downstream traffic and receives redundant upstream traffic. Monitor ports can be provided such that the transmitted signal of the OLT is looped back within the OLT at the OLT MON RX input to actively check the system integrity. Test access ports can also be added at the OLT to allow for pin-pointing cable faults using Optical Time Domain Reflectometers (OTDRs). The fiber cable can consist of many optical fibers, although four are needed in this configuration. This four-fiber configuration has an advantage over the two-fiber system in FIG. 5 in that the ring can be greater diameter, and/or more ONUs can be added to the network, because fewer passive tap couplers are used per fiber path. Both FIG. 5 and FIG. 8 represent redundant fault tolerant ring PON architectures.

Figure 9:
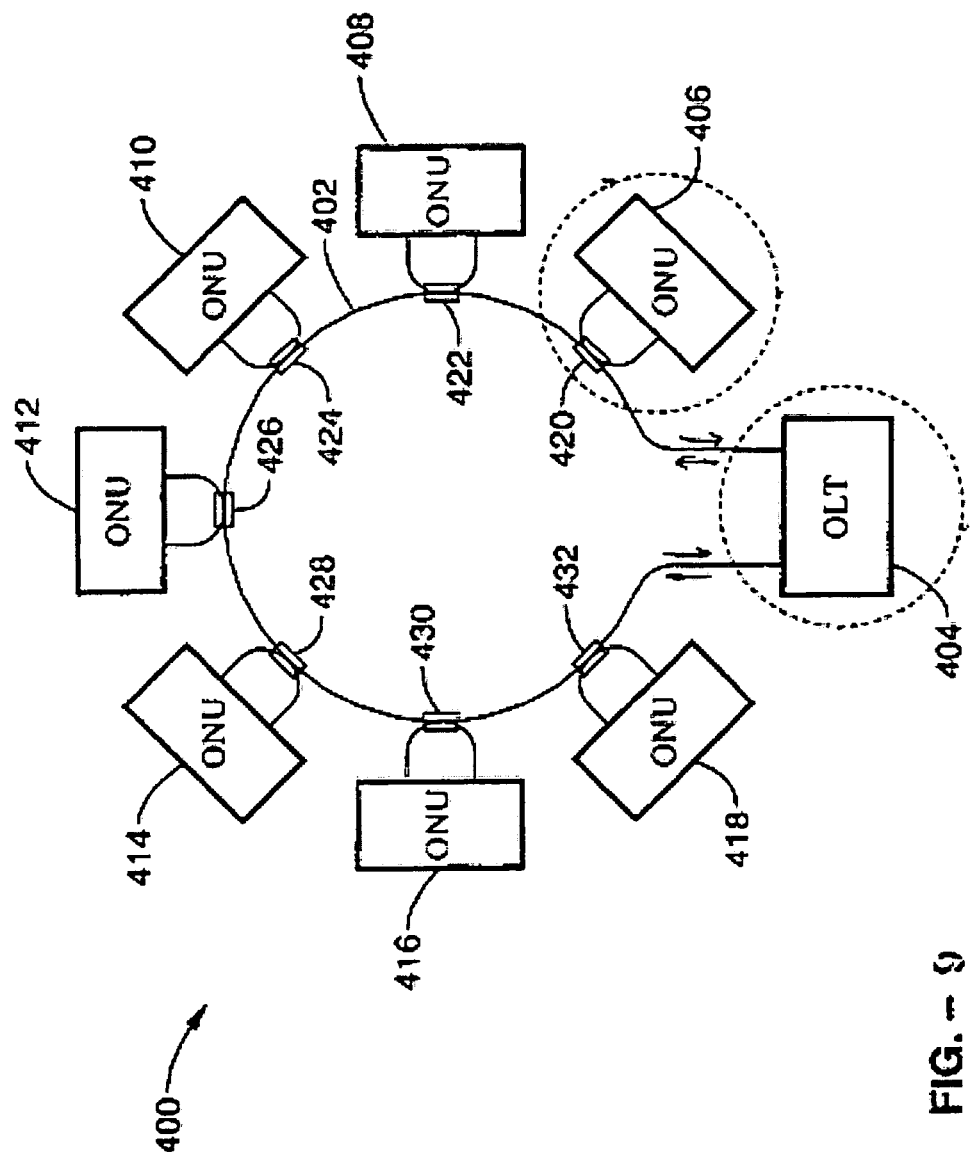
FIG. 9 is a block diagram of a single-fiber ring PON of the present invention.

A block diagram of a single-fiber redundant fault tolerant PON 400 using wavelength division multiplexing is shown in FIG. 9. Here a single optical fiber 402 forms a ring with both ends terminated at the Optical Line Terminal (OLT) 404. Each ONU 406-418 transmits two redundant signals 12 in opposite directions upstream and around the ring to the OLT 404. Similarly, each ONU 406-418 receives two redundant signals 11 from opposite directions downstream around the ring from the OLT. The two wavelengths 11 and 12 can be any wavelength values and are multiplexed and de-multiplexed using WDM couplers. Typical wavelengths are within the 1310 nm and 1550 nm optical communication windows. Tap couplers 420-432 provide the upstream and downstream connectivity with the single fiber 402. The OLT 404 and its interface with the optical fiber 402 is shown in a magnified view 450 of FIG. 10. An exemplary ONU 406 and its interface with the fiber 402 is shown in a magnified view 470 of FIG. 11.

Referring to FIG. 10, the OLT 404 is shown with two optical transmitter ("TX")/receiver ("RX") pairs (each pair can also be referred to as a "transceiver"), wherein the transmitters operate at a first wavelength 11 and the receivers operate at a second wavelength 12. The transmitters are connected to the optical fiber 402 via fiber segments 456, 460 and WDM couplers 462, 464 while the receivers are connected to the optical fiber 402 via fiber segments 454, 458 and the WDM couplers 462, 464. The WDM couplers 462, 464 multiplex and demultiplex the 11 and 12 wavelengths onto and from the optical fiber 402.

Referring to FIG. 11, the exemplary ONU 406 (which preferably has the same hardware configuration as every other ONU shown in FIG. 9) employs two transmitter/receiver pairs, as in the OLT. However, the wavelengths of the transmitters and receivers in the ONU 406 are reversed as compared to those within the OLT 404. Each transmitter/receiver pair, such as those connecting to fiber segments 474, 476, is multiplexed and demultiplexed by a WDM coupler, such as WDM coupler 482, onto and from the optical fiber 402. As shown in FIG. 11, optical coupler 420 is preferably two 1:2 couplers 488, 490 connected in a back-to-back arrangement. Using these back-to-back couplers 488, 490 prevents signals transmitted by one of the ONU's transmitters from immediately looping back on the other redundant transmitter for that same ONU, which could create instability problems where the transmitters are laser diodes.

The ring-based PON shown in FIG. 9 has the advantage of requiring only a single optical fiber. However, the same system could be configured, for example, using two optical fibers, with one TX(12)/RX(11) pair and half of the ONUs connected to one fiber and another TX(12)/RX(11) pair and the other half of ONUs connected to the second fiber. This would allow the ring to have a greater overall diameter or length and/or more ONUs to be added to the fiber ring.

The bandwidth of both ring-based and non-ring-based PONs using TDM/TDMA technology may be significantly increased by using a WDM overlay to add one or more additional wavelength channels to the network. A simple example of this is shown in FIGS. 10 and 11, where a WDM coupler 434 is passively connected to the optical fiber 402 adjacent to the OLT terminations for multiplexing an additional wavelength channel 13 onto the optical fiber 402. As shown in FIG. 11, a corresponding WDM coupler 472 can be provided, for example, in the vicinity of the ONU 406 for demultiplexing the wavelength channel 13 from the optical fiber 402. In one preferred embodiment, the wavelength channel 13 shown in FIGS. 10 and 11 is utilized to provide users connected to the ONUs with an optional subscriber service such as, for example, cable television service. Users not interested in subscribing to such service would simply not be provided with a WDM coupler for demultiplexing the broadcast channel 13, and the wavelength of this channel would preferably be held confidential in an effort to thwart pirating of the service. Although one only additional wavelength channel 13 is shown in FIGS. 10 and 11, it should be understood that an entire group of additional wavelength channels (e.g., 13 to 1N) could likewise be deployed. In this manner, a WDM overlay can be used with a TDM/TDMA PON to support additional traffic on mutually independent wavelength channels.

Figure 12:
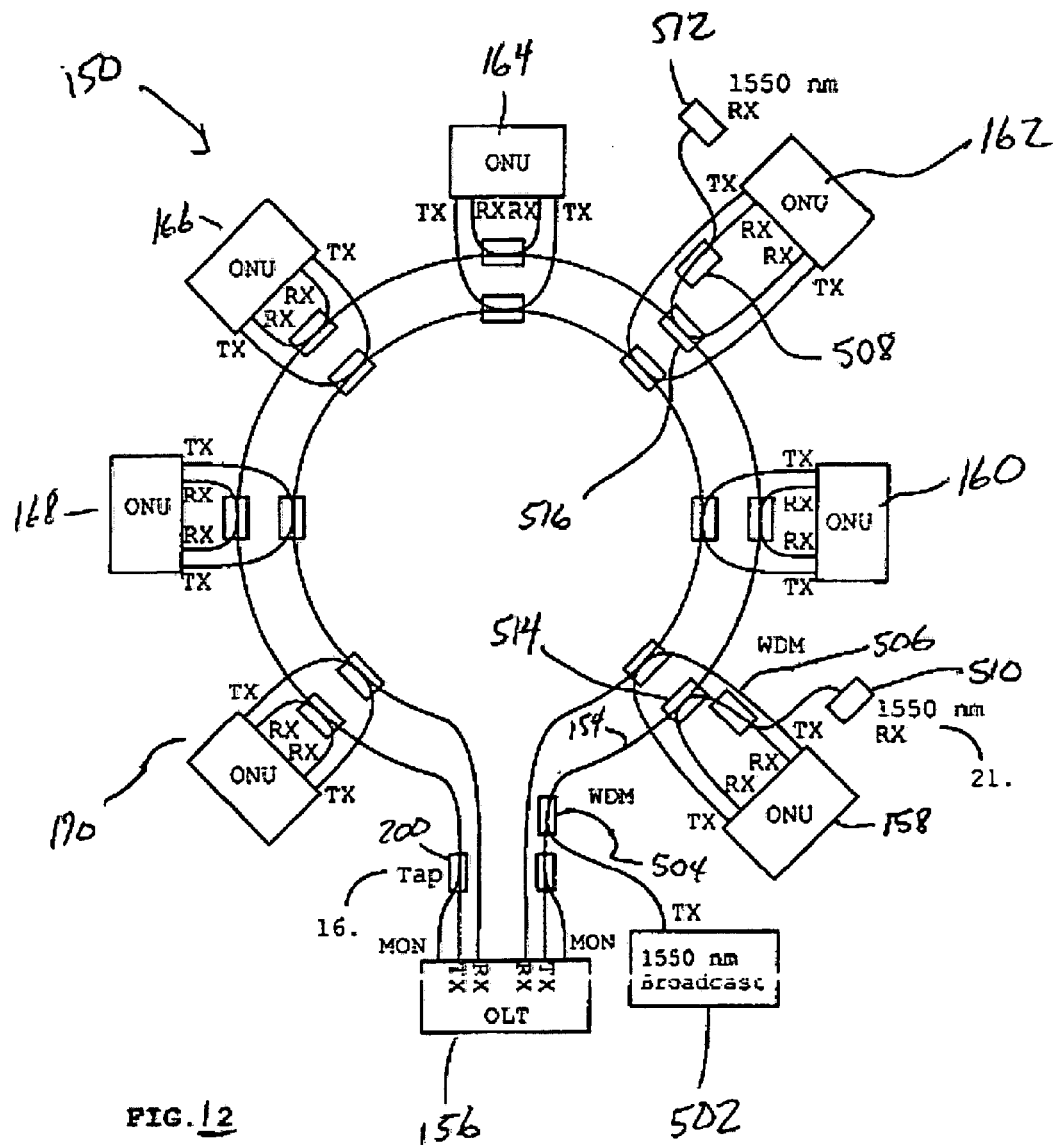
FIG. 12 is a block diagram showing the addition of a broadcast overlay for the PON of FIG. 5.

A specific implementation of a WDM broadcast overlay for the PON 150 shown in FIG. 5 will now be described with reference to FIG. 12. In this particular implementation, the OLT 156 and the ONUs 158-170 communicate in a point-to-multipoint and back manner using a 1310 nm TDM/TDMA process. As shown in FIG. 12, a broadcast overlay on the downstream fiber 154 is provided using a 1550 nm broadcast transmitter 502 that is passively coupled to the downstream fiber 154 via a broadband WDM coupler 504. Thus, broadcast signals transmitted by the transmitter 502 will traverse the entire fiber ring, on the downstream fiber 154, in a counterclockwise direction. The ONUs 158, 162 that are provided with WDM couplers 506, 508 and 1550 nm receivers 510, 512 are enabled to receive the broadcast transmission. The passive couplers 514, 516 associated with the ONUs 158, 162 are preferably broadband components that permit the tapping of both the TDM wavelength and the WDM overlay wavelength. Additionally, the tap monitor 200 at the OLT 156 can detect both the TDM signals and the WDM overlay if a WDM coupler is used at the tap monitor location.

Figure 13A:
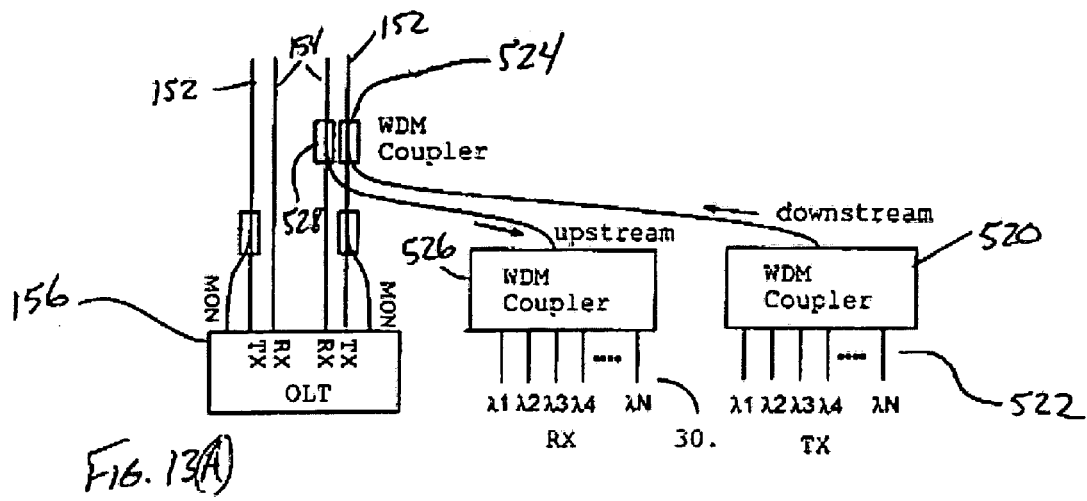
FIGS. 13(a) and 13(b) illustrate a multi-wavelength overlay to the PON of FIG. 5.
Figure 13B:
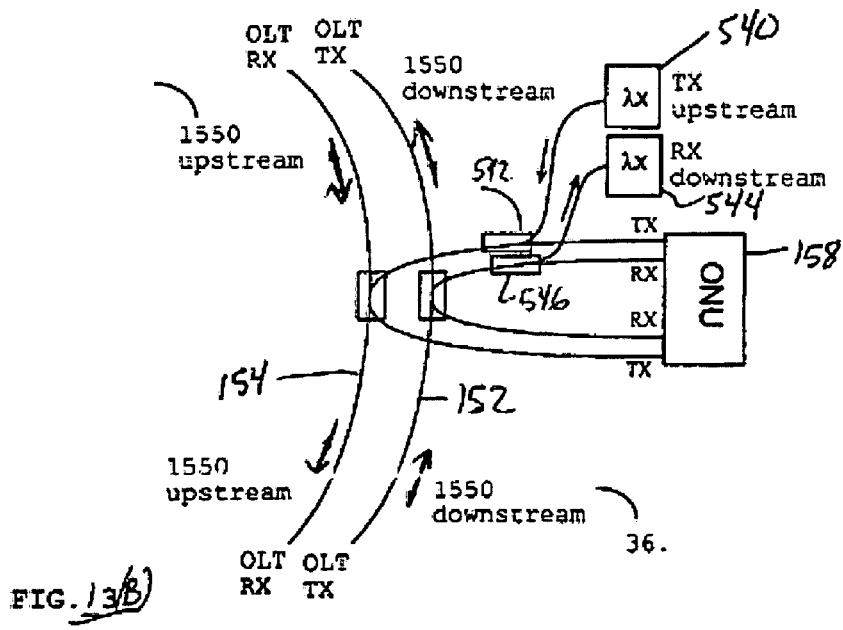

A specific implementation of a WDM overlay utilizing dense wavelengths, such as those spaced less than 3.2 nm apart, for the PON 150 shown in FIG. 5 will now be described with reference to FIGS. 13(*a*) and 13(*b*). Referring first to FIG. 13(*a*), which illustrates the OLT 156 and its connection to the upstream and downstream fibers 152, 154, a dense WDM coupler 520 is provided to couple multiple wavelengths 522, preferably in the 1550 nm window, onto the downstream fiber 152 via a WDM coupler 524. Another dense WDM coupler 526 is connected to the upstream fiber 154 via a WDM coupler 528 to receive WDM traffic from the ONUs, and to separate out the individual wavelengths. The dense WDM couplers 520, 526 can be constructed according to any suitable WDM technology including fused fiber, bragg grating, dichroic filters, arrayed waveguides, combinations thereof, etc. The WDM couplers 524, 528 are preferably broadband WDM couplers for multiplexing and demultiplexing both the 1310 nm TDM/TDMA traffic and the 1550 nm dense overlay traffic. As shown in FIG. 13(*b*), an exemplary ONU 158 that is intended to participate in the WDM overlay is provided with a transmitter 540 that is connected to the upstream fiber 154 via a WDM coupler 542, and a receiver 544 that is connected to the downstream fiber 152 via a WDM coupler 546. In this specific example, the transmitter 540 and receiver 544 both operate at a wavelength 1X and therefore account for only a fraction of the dense WDM traffic transmitted and received by the dense WDM couplers 520, 526 shown in FIG. 13(*a*).

Figure 14A:
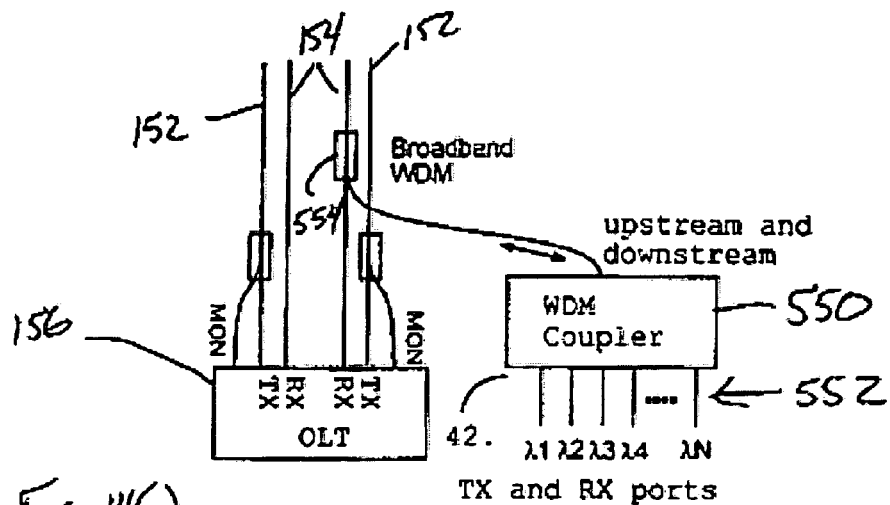
FIGS. 14(a) and 14(b) illustrate a multi-wavelength overlay using only one optical fiber in the fiber ring for the PON of FIG. 5.
Figure 14B:
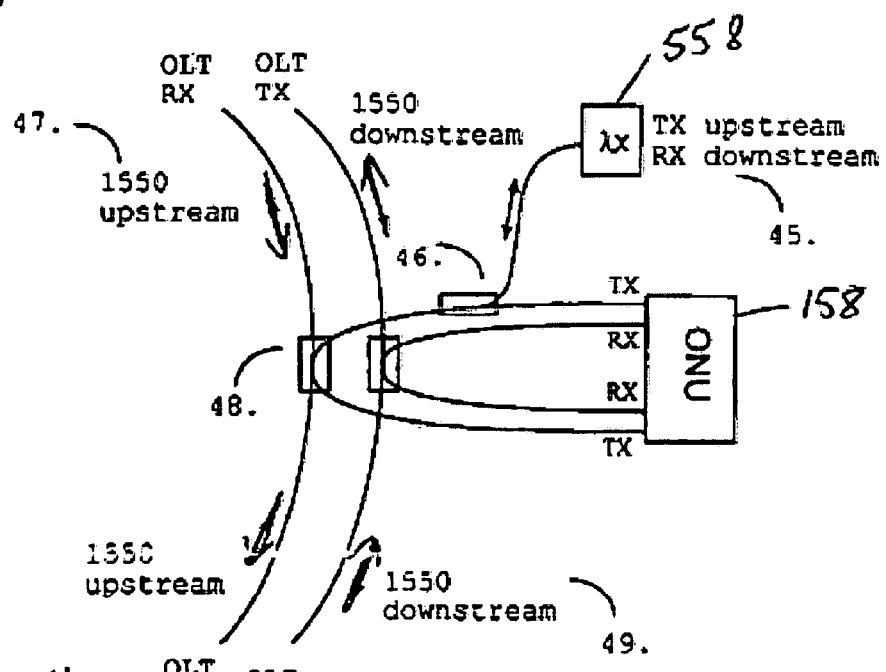

For a smaller number of overlay channels, a single WDM coupler 550 can be used for both multiplexing and demultiplexing downstream and upstream overlay signals, as shown in FIG. 14(*a*). Assume again that the OLT 156 and the ONUs communicate using an underlying 1310 nm TDM/TDMA technology. The WDM wavelengths 552 in this embodiment are preferably 1550 nm. A broadband WDM coupler 554 is used to couple or decouple the base TDMA traffic from the WDM overlay traffic. As shown in FIG. 14(*b*), an ONU 158 intended to participate in the WDM overlay (in which all the ONUs can participate, if desired) is provided with a transceiver 558. This can be a low cost broadband WDM coupler. At the ONU, a broadband WDM coupler is used to separate the WDM overlay traffic from the TDMA base traffic shown as TX or RX at the ONU. A filter at the ONU WDM port is used to select one or more particular wavelengths l1-lN at the ONU station. Each ONU receives all the wavelengths l1-lN at the WDM coupler and selects those according to the filter selected for the WDM coupler. The 1550 nm traffic l1-lN travels on the same fiber as the underlying 1310 nm TDMA traffic. Even though the ONU's overlay traffic travels both upstream and downstream on the same fiber in this embodiment, the same wavelength 1X can be used because the WDM coupler is not transmitting redundant signals around the ring, so there's only one upstream source for wavelength 1X, namely the ONU under discussion.

Although the description above contains many specificities, these should not be construed as limiting the scope of the invention but as merely providing illustrations of some of the presently preferred embodiments. The scope of the invention should therefore be determined by the following claims and their legal equivalents.

What is claimed is:

1. An optical network comprising:
   a. an optical fiber ring;
   b. an optical line terminal for transmitting redundant signals simultaneously through the fiber ring in opposite directions of the ring, said fiber ring having ends terminating at the optical line terminal;
   c. said signals being one or more selected from the group voice, data, or video;
   d. a plurality of optical network units passively connected to the fiber ring, said optical network units receiving signals from the optical line terminal through the fiber ring;
   e. said optical line terminal configured for transmitting TDM signals to the said plurality of optical network units;
   f. said plurality of optical network units configured for transmitting signals through the fiber ring to the optical line terminal according to a time division multiple access protocol;
   g. the optical network units not communicating directly with one another through the fiber ring; and,
   h. said network being a passive optical network.

2. The optical network of claim 1 wherein the fiber ring includes at least one optical fiber through which the optical line terminal transmits said signals to the optical network unit using a first wavelength and through which the optical network unit transmits said signals to the optical line terminal using a second wavelength different than said first wavelength.

3. The optical network of claim 1 wherein the fiber ring includes at least a first optical fiber through which the optical line terminal transmits said signals to the optical network unit and a second optical fiber through which the optical network unit transmits said signals to the optical line terminal.

4. The optical network of claim 1 further comprising a wavelength division multiplexer for overlaying at least one additional wavelength channel to the passive optical network.

5. An optical network comprising:
   a. an optical line terminal;
   b. an optical fiber line having at least one end terminating at the optical line terminal;
   c. a plurality of optical network units passively connected to the fiber line, the optical network units simultaneously receiving TDM signals from and transmitting TDMA signals to the optical line terminal through the fiber line in both directions of the fiber line;

d. said signals being one or more selected from the group voice, data, or video, and, e. a first WDM coupler passively connected to the fiber line for multiplexing an overlay signal with at least one of the TDM said signals and the TDMA said signals for transmission through the fiber line, said overlay signal having a wavelength different than the signals with which it is multiplexed.

6. The optical network of claim 5 wherein the first WDM coupler multiplexes a plurality of overlay signals with at least one of the TDM said signals and the TDMA said signals for transmission through the fiber line, the overlay signals having wavelengths different than the signals with which they are multiplexed.

7. The optical network of claim 5 further comprising an additional signal multiplexed with the TDM said signals for transmission in a downstream direction.

8. The optical network of claim 7 further comprising a second WDM coupler passively connected to the fiber line downstream from the first WDM coupler for demultiplexing the additional signal from the fiber line.

9. The optical network of claim 5 further comprising a second WDM coupler configured to multiplex overlay signals with TDMA said signals for transmission in an upstream direction, and wherein the first WDM coupler is configured for demultiplexing the overlay signals.

10. The optical network of claim 5 further comprising a second WDM coupler passively connected to the fiber line for multiplexing an additional signal with the TDMA said signals for transmission through the fiber line in an upstream direction, said additional signal having a wavelength different than said TDMA said signals.

11. The optical network of claim 10 wherein the first WDM is configured to demultiplex the additional signal from the TDMA said signals.

12. The optical network of claim 5 wherein the optical fiber line comprises a single fiber transmission line through which the TDM and TDMA said signals are transmitted.

13. The optical network of claim 5 wherein the optical fiber line comprises an optical fiber ring having ends terminating at the optical line terminal.

14. An optical network comprising:
a. an optical line terminal for transmitting signals;
b. an optical fiber ring having ends terminating at the optical line terminal;
c. at least one optical network unit passively connected to the fiber ring, said optical line terminal transmitting redundant signals in opposite directions through the fiber ring and said optical network unit receiving the redundant signals from opposite directions through the fiber ring;
d. wherein the optical network unit is configured for transmitting redundant signals in opposite directions through the fiber ring to the optical line terminal; and
e. wherein the fiber ring includes at least a first optical fiber through which the optical line terminal transmits one of the redundant signals in opposite directions to the optical network unit, a second optical fiber through which the optical line terminal transmits another one of the redundant signals in opposite directions to the optical network unit, a third optical fiber through which the optical network unit transmits one of the redundant signals in opposite directions to the optical line terminal, and a fourth optical fiber through which the optical network unit transmits another one of the redundant signals in opposite directions to the optical line terminal.

15. An optical network comprising:
a. an optical line terminal for transmitting signals;
b. an optical fiber ring having ends terminating at the optical line terminal; and
c. at least one optical network unit passively connected to the fiber ring, said optical line terminal transmitting redundant signals simultaneously in opposite directions through the fiber ring and said optical network unit receiving the redundant signals from opposite directions through the fiber ring;
d. the optical network unit is configured for transmitting redundant signals in opposite directions through the fiber ring to the optical line terminal;
e. the fiber ring includes at least a first optical fiber through which the optical line terminal transmits one of the redundant signals in opposite directions to the optical network unit, a second optical fiber through which the optical line terminal transmits another one of the redundant signals in opposite directions to the optical network unit, a third optical fiber through which the optical network unit transmits one of the redundant signals in opposite directions to the optical line terminal, and a fourth optical fiber through which the optical network unit transmits another one of the redundant signals in opposite directions to the optical line terminal.

* * * * *